(12) United States Patent
Kodaypak et al.

(10) Patent No.: US 10,470,077 B1
(45) Date of Patent: Nov. 5, 2019

(54) MESSAGING CENTERS WITH RULE BASED ADAPTIVE RETRY PROFILES FOR 5G OR OTHER NEXT GENERATION NETWORK

(71) Applicant: AT&T Intellectual Property I, L.P., Atlanta, GA (US)

(72) Inventors: Rajendra Prasad Kodaypak, Sammamish, WA (US); Shelly Johnson, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/003,730

(22) Filed: Jun. 8, 2018

(51) Int. Cl.
*H04W 24/00* (2009.01)
*H04W 28/04* (2009.01)
*H04W 4/14* (2009.01)
*H04W 88/18* (2009.01)

(52) U.S. Cl.
CPC ............. *H04W 28/04* (2013.01); *H04W 4/14* (2013.01); *H04W 88/184* (2013.01)

(58) Field of Classification Search
CPC ... H04W 28/0268; H04W 40/30; H04W 8/04; H04W 8/26; H04W 4/14; H04W 52/0229; H04W 12/08; G06F 9/547; H04L 63/0876
USPC .............. 455/466, 461, 414.1; 709/206
See application file for complete search history.

(56) References Cited

U.S. PATENT DOCUMENTS

| | | | |
|---|---|---|---|
| 8,326,985 B2 | 12/2012 | Luna et al. | |
| 9,204,415 B2 | 12/2015 | Ng et al. | |
| 9,344,967 B2 | 5/2016 | Lee et al. | |
| 9,369,961 B2 | 6/2016 | Berggren et al. | |
| 9,497,566 B2 | 11/2016 | Aghili et al. | |
| 9,930,591 B2 | 3/2018 | Won et al. | |
| 2010/0279676 A1 | 11/2010 | Benn et al. | |
| 2011/0047225 A1* | 2/2011 | Smith ............... | H04M 3/42382 709/206 |
| 2013/0301501 A1 | 11/2013 | Olvera-Hernandez et al. | |

(Continued)

FOREIGN PATENT DOCUMENTS

| | | |
|---|---|---|
| WO | 2015170009 A1 | 11/2015 |
| WO | 2016182349 A1 | 11/2016 |
| WO | 2018007642 A1 | 1/2018 |

OTHER PUBLICATIONS

Van et al. "Power-Saving Methods for Internet of Things over Converged Fiber-Wireless Access Networks." IEEE Communications Magazine 54.11 (2016): 166-175. [https://www.researchgate.net/publication/306928954_Power-Saving_Methods_for_Internet_of_Things_over_Converged_Fiber-Wireless_Access_Networks]. Retrieved on Jan. 10, 2017, 10 pages.

(Continued)

Primary Examiner — Phuoc H Doan
(74) Attorney, Agent, or Firm — Amin, Turocy & Watson, LLP

(57) ABSTRACT

Dynamic retry techniques can be leverage by messaging centers to adapt their profiles for a variety of mobile devices including internet-of-things (IoT) devices. The network can utilize a look up table that has real time updated mapping of possible retry profiles against device categories, their groupings, priorities, and/or service level agreements with external IoT providers. For example, a messaging retry algorithm can adjust its upper bounds based on communication received from peer networking functions during the initial registration with the network or as part of the updates due to ongoing IoT device activity.

20 Claims, 12 Drawing Sheets

(56) References Cited

U.S. PATENT DOCUMENTS

| | | |
|---|---|---|
| 2014/0056193 A1 | 2/2014 | Huang et al. |
| 2014/0206333 A1 | 7/2014 | Qiang |
| 2014/0269658 A1 | 9/2014 | Sadasivam et al. |
| 2015/0163831 A1 | 6/2015 | Wang et al. |
| 2015/0215868 A1 | 7/2015 | Xu |
| 2015/0271229 A1 | 9/2015 | Bullotta et al. |
| 2015/0296482 A1 | 10/2015 | Baskar et al. |
| 2015/0341884 A1 | 11/2015 | Das et al. |
| 2016/0127995 A1 | 5/2016 | Merlin et al. |
| 2016/0142974 A1 | 5/2016 | Lindoff et al. |
| 2016/0205622 A1 | 7/2016 | Ronneke et al. |
| 2016/0242231 A1 | 8/2016 | Vajapeyam et al. |
| 2016/0255578 A1 | 9/2016 | Lin et al. |
| 2016/0286466 A1 | 9/2016 | Huang et al. |
| 2016/0286491 A1 | 9/2016 | Haneji et al. |
| 2016/0295504 A1 | 10/2016 | Wang et al. |
| 2016/0316432 A1 | 10/2016 | Hsu et al. |
| 2016/0345293 A1 | 11/2016 | Diachina et al. |
| 2017/0272993 A1 | 9/2017 | Jeong et al. |
| 2017/0311303 A1 | 10/2017 | Ahn et al. |
| 2018/0054376 A1 | 2/2018 | Hershey et al. |
| 2018/0054796 A1 | 2/2018 | Edge |
| 2018/0063860 A1 | 3/2018 | Yeung et al. |
| 2018/0110085 A1 | 4/2018 | Tseng |
| 2018/0146260 A1 | 5/2018 | Li et al. |
| 2018/0324671 A1* | 11/2018 | Palnati ................ H04L 63/0876 |

OTHER PUBLICATIONS

Abbas et al., "A survey on energy conserving mechanisms for the internet of things: Wireless networking aspects." Sensors 15.10 (2015): 24818-24847. [https://www.ncbi.nlm.nih.gov/pmc/articles/PMC4634437/#sec4-sensors-15-24818]. Retrieved on Jan. 10, 2017, 19 pages.

Kuo et al., "Power Saving Scheduling Scheme for Internet of Things over LTE/LTE-Advanced Networks." Mobile Information Systems 2015 (2015). [http://downloads.hindawi.com/journals/misy/2015/971538.pdf]. Retrieved on Jan. 10, 2017, 12 pages.

Non-Final Office Action received for U.S. Appl. No. 15/464,301 dated Mar. 7, 2019, 37 Pages.

3GPP, "Universal Mobile Telecommunications System (UMTS); LTE; Mobility Management Entity (MME)," Visitor Location Register (VLR) SGs interface specification (3GPP TS 29.118 version 13.6.0 Release 13), © European Telecommunications Standards Institute 2017, 78 pages.

* cited by examiner

MESSAGING CENTERS WITH RULE BASED ADAPTIVE RETRY PROFILES FOR 5G OR OTHER NEXT GENERATION NETWORK

TECHNICAL FIELD

This disclosure relates generally to messaging centers. For example, this disclosure relates to facilitating rule based adaptive retry profiles for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating rule based adaptive retry profiles is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
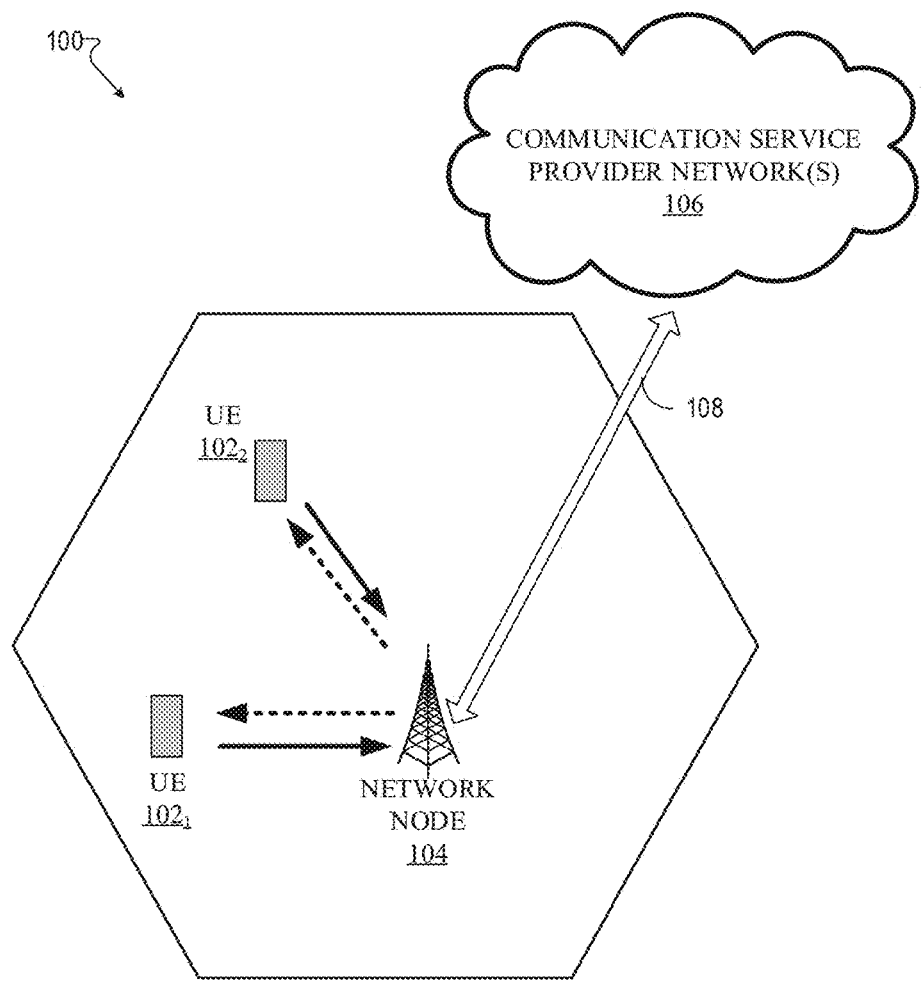
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate rule based adaptive retry profiles for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate rule based adaptive retry profiles for a 5G network. Facilitating rule based adaptive retry profiles for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A dynamic adaptation of retry algorithms within messaging centers can take IoT device categories, their identity mappings with external entities, reachability based on device behaviors, and mobility management states into account to ensure reliable message delivery. The messaging centers can have largely static provisioning retry methods that are quite uniform in terms of their device behaviors. Current short message retry methods in the messaging centers are static in nature as they comprise a limited set of profiles with a well-defined timer and count values. As a result, the message retry algorithm exercises a uniform retry policy across the serving mobile devices. For IoT devices with a wide range of active and sleep mode timing needs, the static retry algorithms are not adequate.

Messaging systems for various message types (e.g., internet protocol messaging, short messages, etc.) can be improved by utilizing adaptive retry profiles. Currently, the retry method is based on one control, which is an error message received back. However, additional parameters can be evaluated to help determine what the retry method should be.

For example, retry methods can be defined in the short message service center (SMSC), which can contain a defined number of retries to address limits on the buffering capabilities of the messaging centers. Because internet-of-things (IoT) devices can have sleep patterns that can run for a defined time period (e.g., up to a maximum of 413 days), the SMSC, a mobility management entity (MME), and a mobile switching center (MSC) can work together to determine the sleep patterns of the different types of devices. The SMSC can adjust its parameters according to the type of device it is servicing. Consequently, if the system can determine that a device is an IoT device and determine the sleep cycle of the IoT device, then the system can determine a retry profile and keep the IoT device messages (for longer than the standard 3-day period that text messages are kept currently) to be resent at a later time. IoT devices can communicate with the MME via a control plane exchange. Thus, the MME can be the first point in the control plane to be aware of the IoT device status (e.g., sleep mode, requesting sleep cycle, etc.). The MME can then communicate this information in a message to the MSC, on an SGs interface, so that the MSC can modify the message and send the message back to the SMSC. Once the SMSC receives the message from the MME through the MSC, then the message can be analyzed to adjust the retry methods. The retry methods can adjust depending upon the sleep window of the IoT device, when the IoT device should wake up next, and/or slightly before the IoT device is about to wake up. For example, when the IoT device is about to wake up, the MME can send an indication back to the SMSC through the MSC, or it can send the indication, directly on the SGs interface, to the SMSC. Thus, the SMSC can adjust operations based on received feedback and selectively transition from the default retry method to an updated retry method (e.g., random, exponential, etc.) based on the times that are being received from the MME and based on the different types of IoT devices.

Different types of devices can also comprise varying sleep cycles. Thus, message retries can also be based on the device types. Because the system can facilitate the message reaching the device on time or the message being buffered in the SMSC for a defined duration of time that does not tax the messaging node performance, the system can balance between the wake-up time that the MME is going to send to the SMSC and the retry methods for a specific period of time. However, for some high priority devices, there can be various buffering methods used based on the priority of the device. For example, a certain class of devices serving one vertical can originate message notifications to their application servers based on pre-provisioning of the application clients. Other classes of devices can wake up at certain intervals, to conserve battery resources, due to their sleep patterns and then receive their targeted messages.

A mapping table within the integrated SMSC-SCEF, a messaging retry node, and/or the SMSC, can comprise IoT device groupings based on a variety of device attributes such the following: internal mobile subscriber identity network subsystem (IMSI-NS) range, external short messaging identity (ESME ID) tied to a given IoT service provider, group ID, device category, access priority, service priority, message priority, buffer depth for queuing, protocol identifier (PID), data encoding, and/or variations in handling over the air (OTA) traffic with different retries. The ESME ID can be a profile ID that is set for specific types of traffic, unique to a specific carrier. Thus, since the RAN can already know the ESME ID number, in one or more embodiments, the ESME ID number does not have to coordinated. Upon reception of the sleep timer indication in the signaling message, the mapping table can be updated in real-time and the SMSC could adapt its retry profile with the net maximum delay for a given retry that exceeds the sleep timer value. This can allow the node to store the message for the targeted device and deliver it when the device wakes up after an extended sleep cycle. For example, if the SMSC has a static mapping that exhausts after 3 days, the message can only be stored for 3 days and then discarded. With a dynamic mapping mechanism in the SMSC, the maximum storage period can be adapted for a device based on its sleep timer running in the MME context learned via the updates.

Dynamic mapping and adaptation functions in the messaging centers can provide a more efficient service delivery method to IoT service providers that can deal with a variety of future devices that leverage the wide area cellular network infrastructure. As the next generation of wireless networking technologies advance to meet the needs of smart connectivity, the application behaviors in the messaging centers can be adapted to be flexible, intelligent, and scalable to address the services. The retry methods using the mapping tables can be further enhanced and differentiated at the vendor level, where they can be selectively controlled based on their network function performance while considering protocol identifiers, data encoding schemes, and traffic types.

In one embodiment, described herein is a method comprising receiving, by a wireless network short message service center device comprising a processor, status data representative of a status of a mobile device of a wireless network. Based on the receiving the status data, the method can comprise modifying, by the wireless network short message service center device, a retry protocol associated with sending retry messages to the mobile device, resulting in a modified retry protocol. Additionally, the method can comprise sending, by the wireless network short message service center device, a message to the mobile device. Furthermore, in response to receiving an error message associated with the message sent to the mobile device, the method can comprise resending, by the wireless network short message service center device, the message in accordance with the modified retry protocol.

According to another embodiment, a system can facilitate receiving mode data representative of a mode of an internet-of-things device of a wireless network. In response to the receiving the mode data, the system can facilitate modifying a message retry protocol associated with resending messages to the internet-of-things device, resulting in a modified message retry protocol. In response to facilitating sending a message to the internet-of-things device, the system operations can comprise receiving an error message associated with a reception of the message. Additionally, in response to the receiving the error message, the system can facilitate resending the message to the internet-of-things device in accordance with the modified message retry protocol.

According to yet another embodiment, described herein is a machine-readable storage medium that can perform the operations comprising receiving status data representative of a status of a mobile device of a wireless network. In response to the receiving the status data, the machine-readable storage medium can perform the operations comprising adjusting a retry protocol associated with sending retry messages to the mobile device, resulting in a modified retry protocol, and sending a message to the mobile device. In response to the sending the message to the mobile device, the machine-readable storage medium can perform the operations comprising receiving an error message associated with the message sent to the mobile device. Furthermore, in response to the receiving the error message, the machine-readable storage medium can perform the operations comprising resending the message in accordance with the modified retry protocol.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
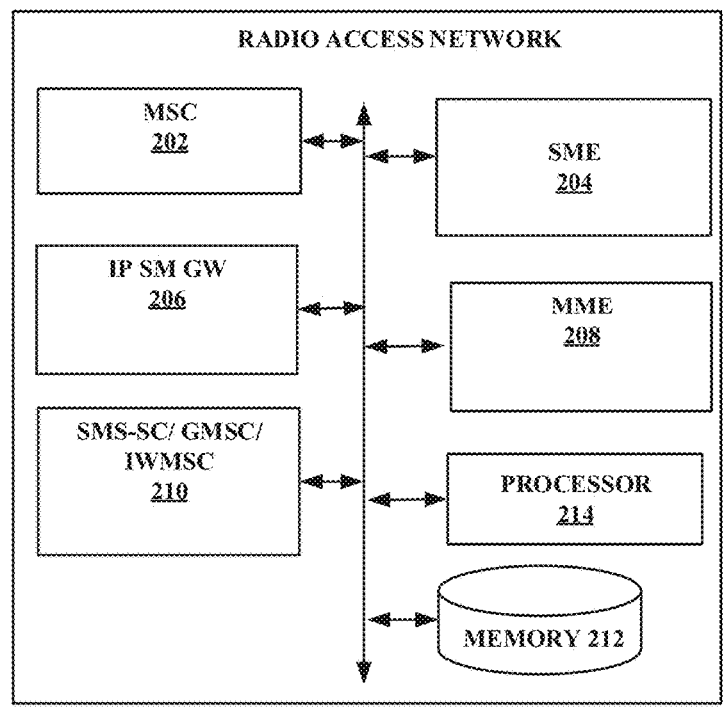
FIG. 2 illustrates an example schematic system block diagram of a radio access network according to one or more embodiments.

Referring now to FIG. 2, illustrated is an example schematic system block diagram of a radio access network according to one or more embodiments.

A radio access network 200 can comprise several communicatively coupled components including, but not limited to: an MSC 202, an SME 204, an IP SM GW 206, an MME 208, an SMS-SC/GMSC/IWMSC 210, a processor 214, and a memory 212 that can bi-directionally communicate with each other. Aspects of the processor 214 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the radio access network 300. In an aspect, the radio access network can also include the memory 212 that stores computer executable components and instructions.

Mobile terminated messages for UEs 102 can be delivered from the SMSC 210 to the MME 208 via the MSC 202. The MME 208 can be triggered to send message data to the MSC 202 in response to a mobile terminated message delivery attempted during a sleep time of the UEs 102. Thus, in response to the message data, the MSC 202 can interpret the message data as the subscriber not being available. The MSC 202 can then allocate an internal diagnostic error code that can be sent to the SMSC 210. The SMSC 210 can then leverage this data to use a specific retry profile via an internal mapping process.

Figure 3:
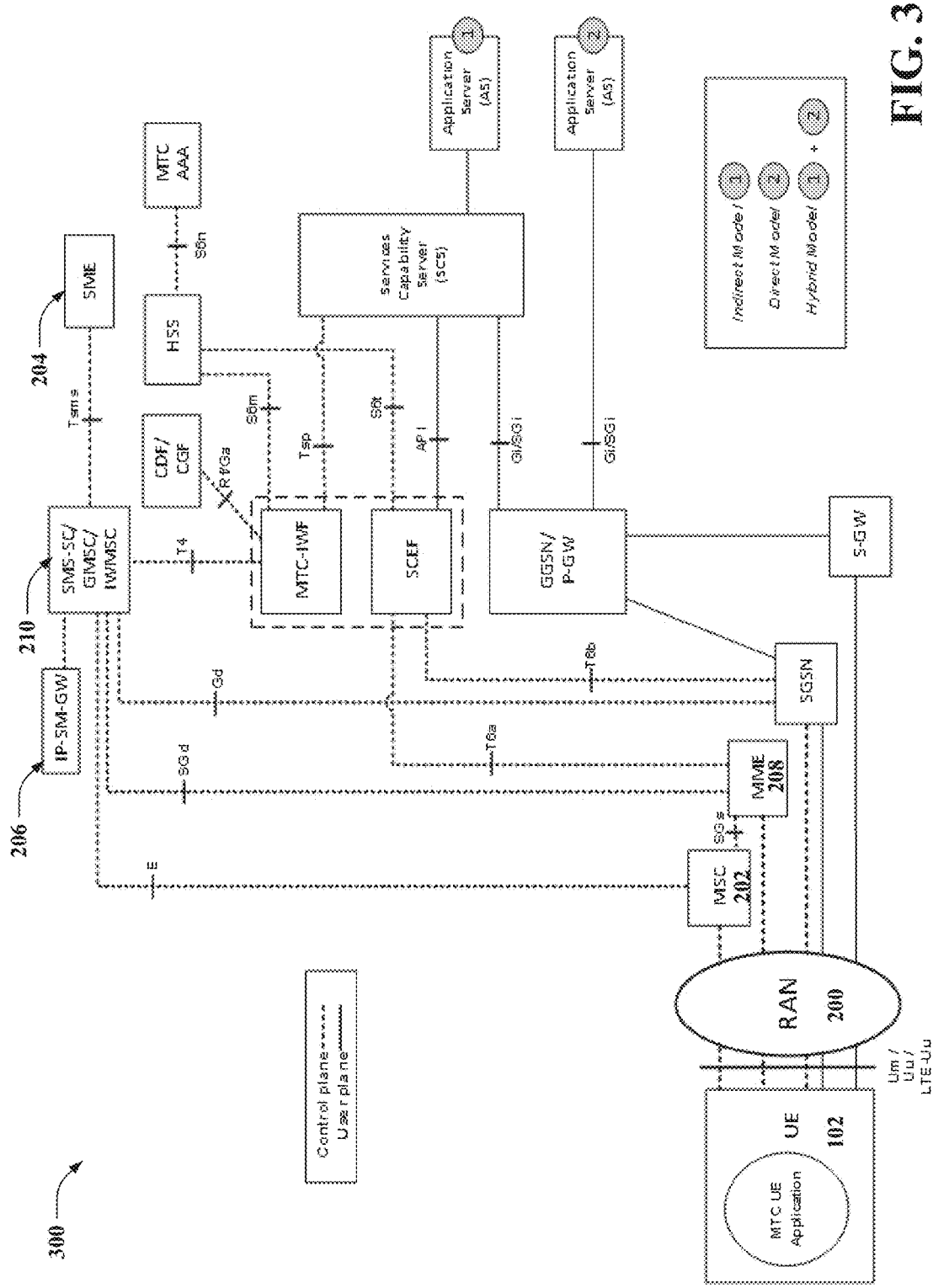
FIG. 3 illustrates an example schematic system block diagram of a mobile telecommunications company architecture according to one or more embodiments.

Referring now to FIG. 3, illustrated is an example schematic system block diagram of a mobile telecommunications company architecture 300 according to one or more embodiments.

The mobile terminated messages for UEs 102 can be delivered from the SMSC 210 to the MME 208 either directly via an SGd or indirectly via the MSC 202 using an SGs interface. Mobile originated messages from the UE 102 can traverse similar paths to reach the SMSC 210 before being routed to their IoT service providers (e.g., station management entity (SME) 204).

For example, when the UE 102 goes into a deep sleep mode such as power saving mode with extended sleep durations, the MME 208 can send a "UE unreachable" message to the MSC 202 in response to a mobile terminated message delivery attempted during the deep sleep time. This can cause the MSC 202 to interpret the UE unreachable message as the subscriber not being available and thus allocate an internal diagnostic error code. The error code can then be sent to the SMSC 210, as its direct peer node. Because the SMSC 210 can know the type of device, the SMSC 210 can use a specific retry profile via an internal mapping process.

A mapping table within the SMSC 210 can comprise IOT device groupings mapped to a variety of system attributes such the following: internal mobile subscriber identity network subsystem (IMSI-NS) range, ESME ID, group ID, device category, access priority, service priority, message priority, buffer depth for queuing, protocol identifier (PID), data encoding, and/or variations in handling over the air (OTA) traffic with different retries. Thus, the retries can be based on the retry profiles associated with the UE 102 groupings and their system attributes.

Figure 4:
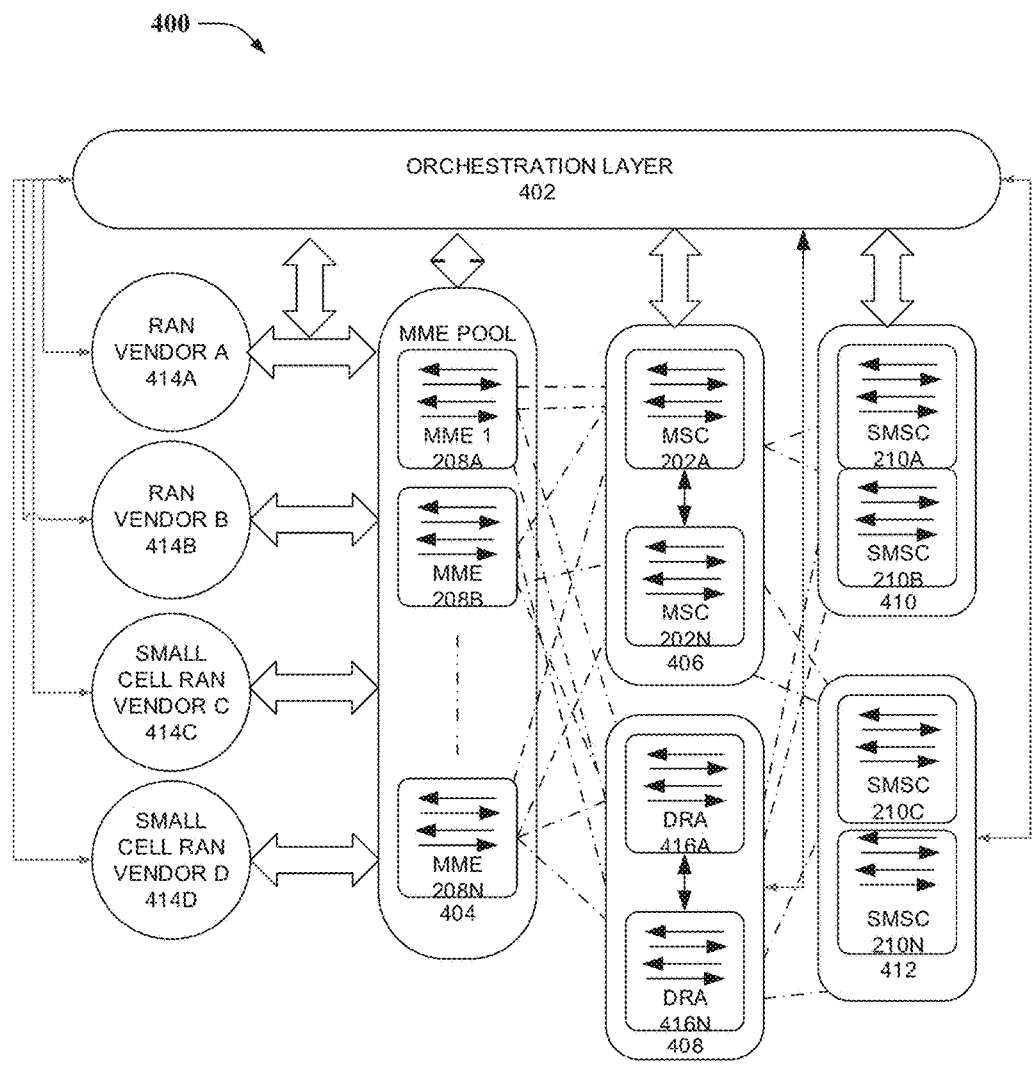
FIG. 4 illustrates an example schematic system block diagram of a small cell radio access network and core network according to one or more embodiments.

Referring now to FIG. 4, illustrated is an example schematic system block diagram of a small cell radio access network and core network 400 according to one or more embodiments.

As depicted in FIG. 4, an MME pool 404, communicating with multiple vendors 414A, 414B, 414C, 414D can serve multiple RAN vendor configurations in the operator network. The SMSC pools 410, 412 can interact with the MME pool 404 via direct connectivity using the SGs interface or via the centralized diameter routing agent using the SGd interface.

RAN vendors 414A, 414B, 414C, 414D (e.g., Erickson, Nokia, Samsung, etc.) can service the UEs 102 in the network. The MME pool 404 can comprise a pool of MMEs 208 serving as the RAN functions. The MMEs 208A, 208B, . . . 208N can communicate with the MSCs 406A, . . . 406N and DRA pool 408, comprising DRAs 416A, . . . 416N on the SGd interface. The orchestration layer 402 can orchestrate the entire service by feeding the network functions based on how events are occurring in the RAN 200. Although FIG. 4 depicts a finite number of the aforementioned components, it should be noted that any number of components are possible within the RAN 200.

Figure 5:
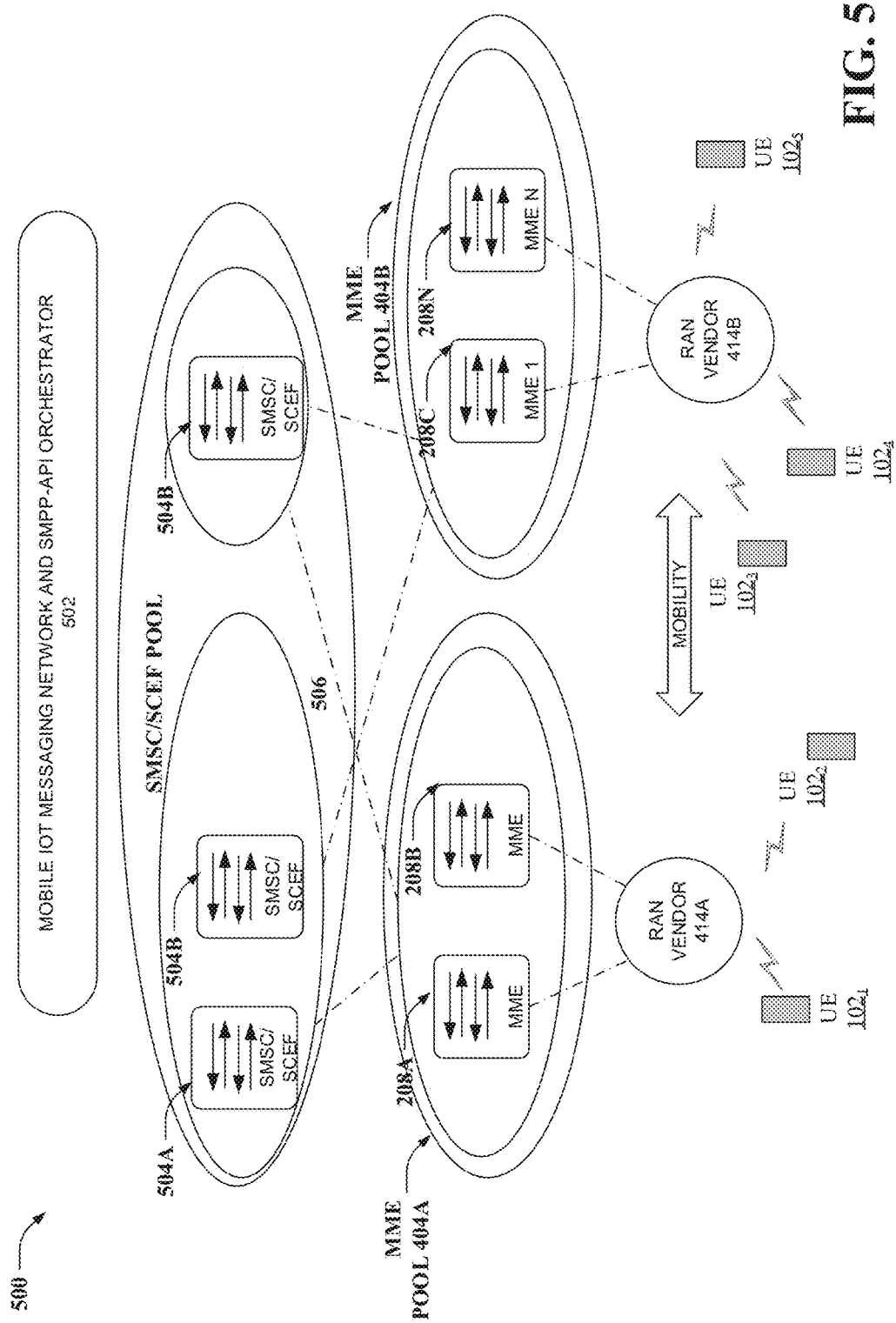
FIG. 5 illustrates an example schematic system block diagram of short message service center pool deployment according to one or more embodiments.

Referring now to FIG. 5 illustrates an example schematic system block diagram of short message service center pool deployment 500 according to one or more embodiments.

In one or more other embodiments, a network function called the service capability exposure function (SCEF) can interwork with the SMSC 210 via a machine type communications interworking function (MTC-IWF) for messaging delivery. This can be orchstrated by a mobile IoT messaging network and short message peer-to-peer (SMPP)-API orchestrator 502. The MTC-IWF and SCEF functions can be integrated with the SMSC 210 to simplify the message delivery methods towards network nodes such as the MSC 202 and MME 208 on one end and expose these functions via rest APIs to the external IoT service providers. The integrated SMSC-SCEF function can be deployed in a geo-redundant pooled configuration comprising a centralized SMSC pool with mesh connectivity to distributed and regionalized MME pools as depicted in FIG. 5.

In large operator environments comprising multi-vendor RAN 414A, 414B and MME pool 404A, 404B configurations, the pooled SMSC-SCEF architecture 506 comprising SMSC-SCEFs 504A, 504B, . . . 504N can be used for direct message delivery leveraging the SGd signaling interface towards the MMEs 208A, 208B, 208C, . . . 208N. Alternately, if the mobility infrastructure continues to support legacy MSCs 202 in the network upon re-farming 3G spectrum for LTE-A and/or 5G radio network evolution, the integrated SMSC-SCEFs 504A, 504B, . . . 504N can still interwork with the legacy MSCs 202 using the SGs interface for message delivery.

Figure 6:
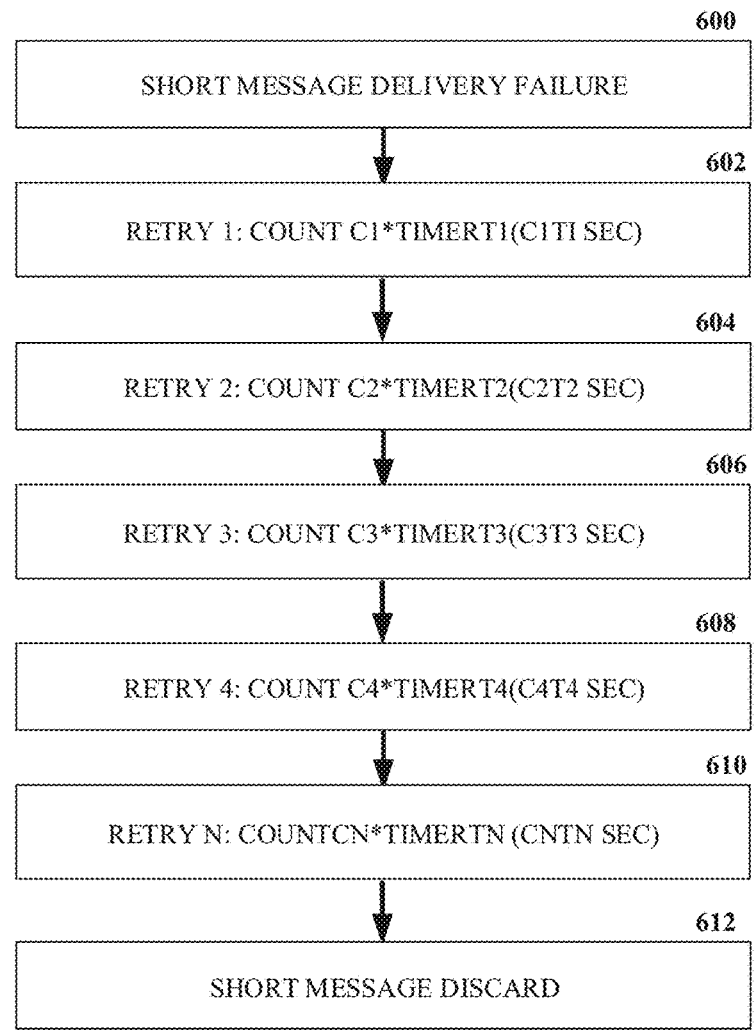
FIG. 6 illustrates an example flow diagram for a short message retry for a 5G network according to one or more embodiments.

Referring now to FIG. 6, illustrated is an example flow diagram for a short message retry for a 5G network according to one or more embodiments.

As the IoT device volumes grow in the LTE networks, the signaling events associated with message delivery and their retries, based on static mapping, can get exacerbated in the network. As opposed to the static retry mapping profiles in the SMSC, the integrated SMSC-SCEF 504A, 504B, . . . 504N function in the evolved mobility network can have intelligent and adaptive retry profiles with the number of retries that can be adjusted based on enhanced error codes from peer nodes such as the MSC 202 and MME 208 and based on device groupings and international mobile subscriber identity network subsystems (IMSI-NS). For example, more important messages can utilize more aggressive retry profiles.

Additionally, when UEs 102 go into deep sleep mode such as power saving mode (PSM), the MME 208, based on their sleep timer, can indicate UE 102 unavailability along with the group ID the UE 102 belongs to and the sleep timer value. Based on this information, the MSC could send a suitable indication to a home location register (HLR) so that the registration status of the UE 102 is updated accordingly. A home subscriber server (HSS) can then alert the SMSC-SCEF 504A, 504B, ... 504N to take the UE 102 state into account when sending the mobile terminated messages.

For a group of devices belonging to an industry vertical with a unique sleep timer, the MME 208 can indicate a suitable cause code to the MSC 202 or the SMSC 210 providing an indication that the timer is for a grouped device category. Upon reception of this cause code, the SMSC 210 can map the cause code to a unique retry profile that is aligned with the UE 102 attributes as evaluated within its mapping table.

As the UE 102 characteristics changes and belongs to a different group when servicing across a different industry vertical, the sleep timer indications to the MME 208 can be different and the network can to update the UE 102 context in its visiting location register (VLR) and indicate a suitable error code to the MSC 202 and/or SMSC 210 so that it can adjust its retry profile based on an internal lookup of its mapping table.

Consequently, since N can be variable based on different types of devices, device behavior, and/or types of traffic, after a short message delivery failure 600, values dynamically selected from retry profiles can be input into any of the retry functions 602, 604, 606, 608, 610 before the short message is discarded 612.

Figure 7:
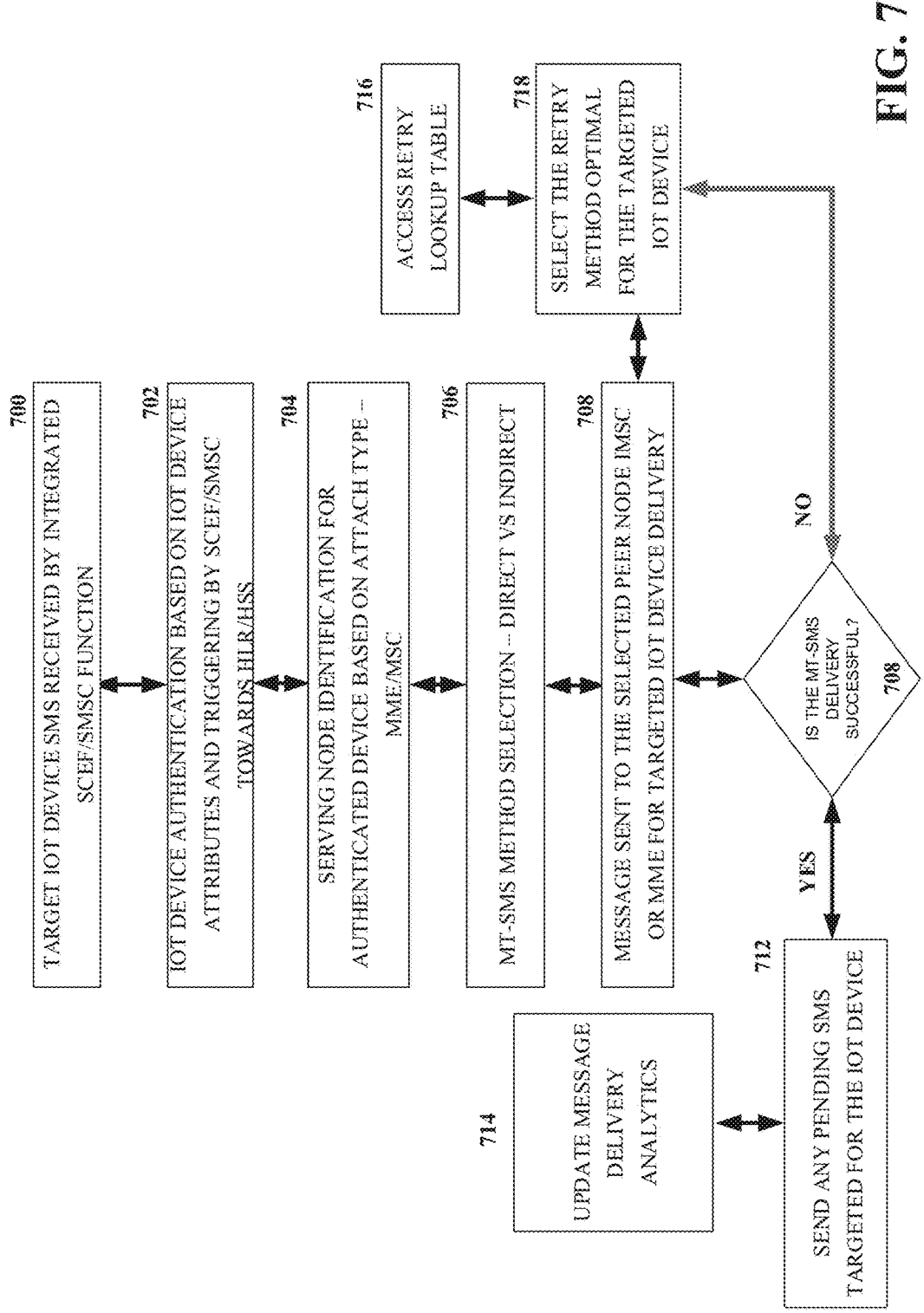
FIG. 7 illustrates an example flow diagram for short message retry estimation for a 5G network according to one or more embodiments.

Referring now to FIG. 7, illustrated is an example flow diagram for short message retry estimation for a 5G network according to one or more embodiments.

At element 700, the SCEF/SMSC 504 function can receive an SMS message targeted towards the UE 102. Thereafter, at element 702, the UE 102 can be authenticated based on the UE 102 attributes, and then the SCEF/SMSC 504 can send the associated data to the HLR and/or HSS. At element 704, the MME 208 and/or the MSC 202 can then identify the UE 102 based on the authentication. As discussed with regards to FIGS. 3 and 4, the system can then select a direct route versus an indirect route at element 706 to send the message to a selected peer node MSC 202 or the MME 208 for targeted UE 102 delivery. Simultaneously and/or thereafter, with selecting a default retry method or an optimal retry method at element 718, the system can determine whether the SMS message delivery was successful at element 708. If the SMS delivery was not successful, the system can select another optimal retry method at element 718, wherein the retry method can be selected from accessing a retry lookup table at element 716. The new optimal retry method can then be sent back to element 708 to be used in testing a new retry. However, if the delivery is successful, the system can send any pending SMS targeted for the UE 102 to the UE 102 at element 712 and then update message delivery analytics in the SMSC 210 and its systems.

Figure 8:
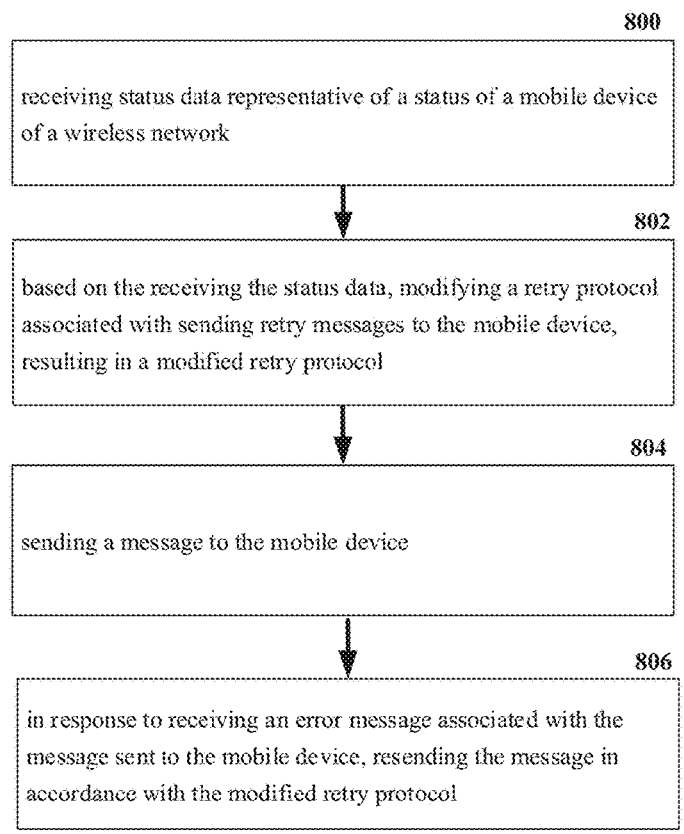
FIG. 8 illustrates an example flow diagram for a method for short message retry for a 5G network according to one or more embodiments.

Referring now to FIG. 8, illustrated is an example flow diagram for a method for short message retry for a 5G network according to one or more embodiments. At element 800, a method can comprise receiving (e.g., via the MSC 202) status data representative of a status of a mobile device (e.g. UE 102) of a wireless network (e.g., RAN 200). Based on the receiving the status data, the method can comprise modifying (e.g., via the MSC 202) a retry protocol associated with sending retry messages to the mobile device (e.g., UE 102), resulting in a modified retry protocol at element 802. Additionally, the method can comprise sending (e.g., via the MSC 202) a message to the mobile device (e.g. UE 102) at element 804. Furthermore, at element 806, in response to receiving an error message associated with the message sent to the mobile device (e.g. UE 102), the method can comprise resending (e.g., via the MSC 202) the message in accordance with the modified retry protocol.

Figure 9:
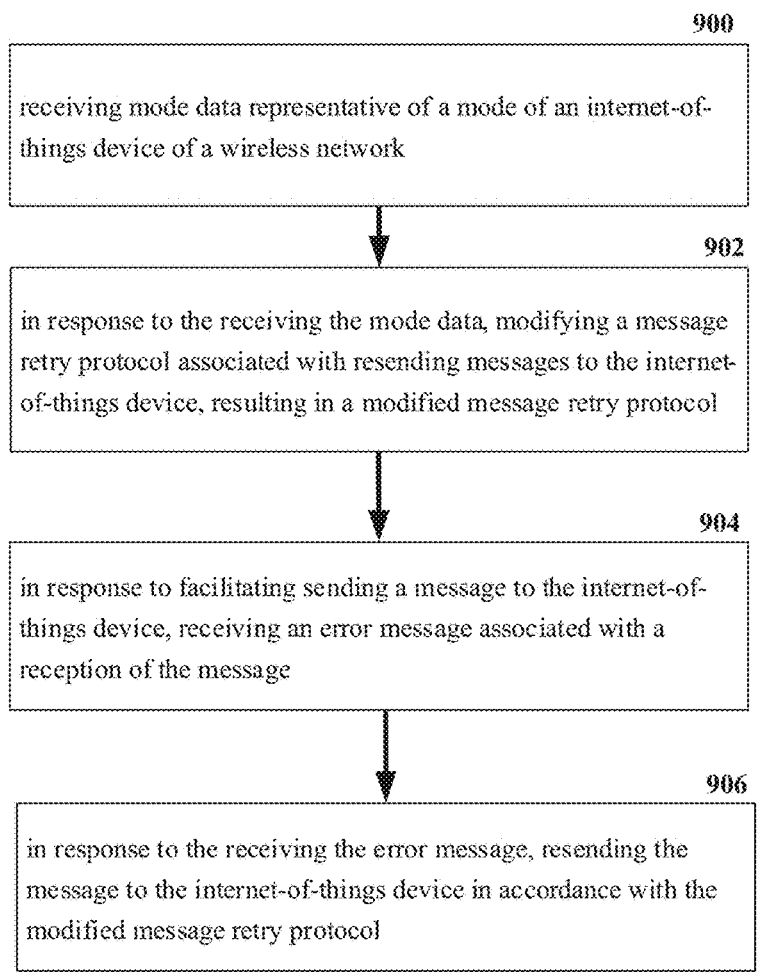
FIG. 9 illustrates an example flow diagram for a system for short message retry for a 5G network according to one or more embodiments.

Referring now to FIG. 9, illustrates an example flow diagram for a system for short message retry for a 5G network according to one or more embodiments. At element 900, a system can facilitate receiving mode data representative of a mode of an internet-of-things device (e.g., UE 102) of a wireless network (e.g., RAN 200). In response to the receiving the mode data, the system can facilitate modifying (e.g., via the MSC 202) a message retry protocol associated with resending messages to the internet-of-things device (e.g., UE 102), resulting in a modified message retry protocol at element 902. In response to facilitating sending a message to the internet-of-things device (e.g., UE 102), the system operations can comprise receiving an error message (e.g., via the SMSC 210) associated with a reception of the message at element 904. Additionally, at element 906, in response to the receiving the error message, the system can facilitate resending (e.g. the MSC 202 and/or the MME 208) the message to the internet-of-things device (e.g., UE 102) in accordance with the modified message retry protocol.

Figure 10:
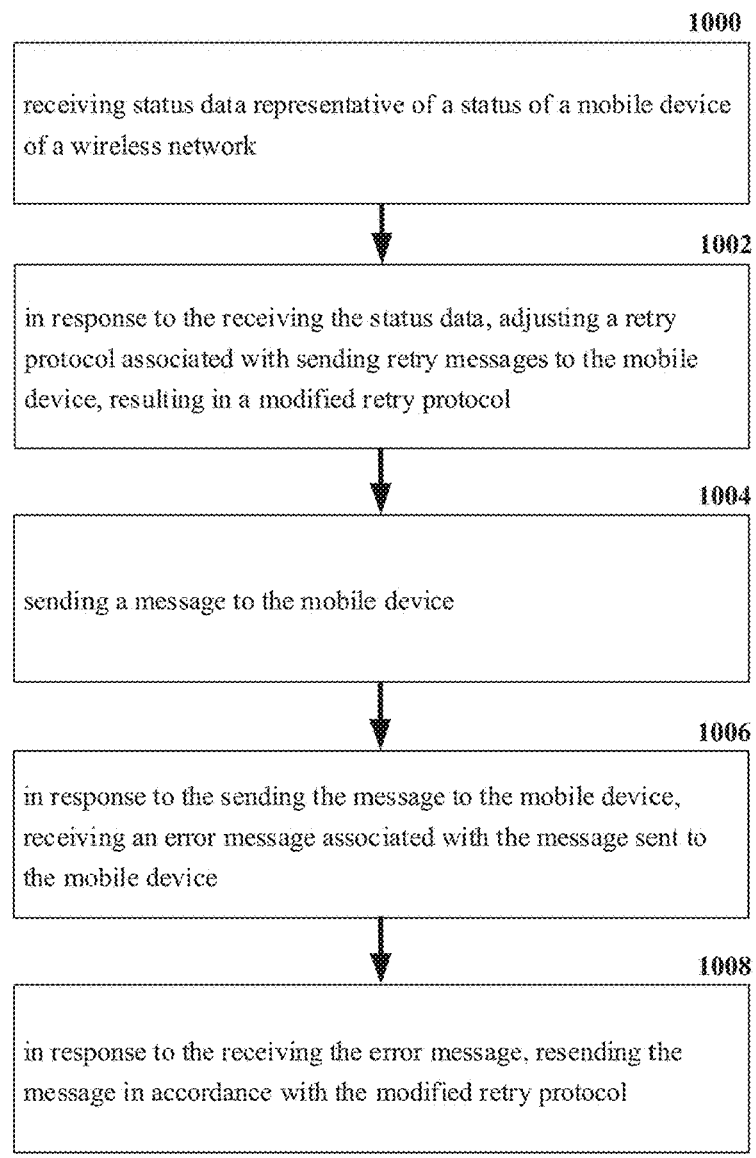
FIG. 10 illustrates an example flow diagram for a machine-readable medium for short message retry for a 5G network according to one or more embodiments.

Referring now to FIG. 10, illustrated is an example flow diagram for a machine-readable medium for short message retry for a 5G network according to one or more embodiments. At element 1000, a machine-readable storage medium can perform the operations comprising receiving (e.g., via the MSC 202) status data representative of a status of a mobile device (e.g., UE 102) of a wireless network (e.g., RAN 200). In response to the receiving the status data, at element 1002, the machine-readable storage medium can perform the operations comprising adjusting a retry protocol (e.g., via the MSC 202) associated with sending retry messages to the mobile device (e.g., UE 102), resulting in a modified retry protocol, and sending a message (e.g. the MSC 202 and/or the MME 208) to the mobile device (e.g., UE 102) at element 1004. In response to the sending the message to the mobile device (e.g., UE 102), the machine-readable storage medium can perform the operations comprising receiving an error message (e.g., via the SMSC 210) associated with the message sent to the mobile device (e.g., UE 102) at element 1006. Furthermore, at element 1008, in response to the receiving the error message, the machine-readable storage medium can perform the operations comprising resending (e.g. the MSC 202 and/or the MME 208) the message in accordance with the modified retry protocol.

Figure 11:
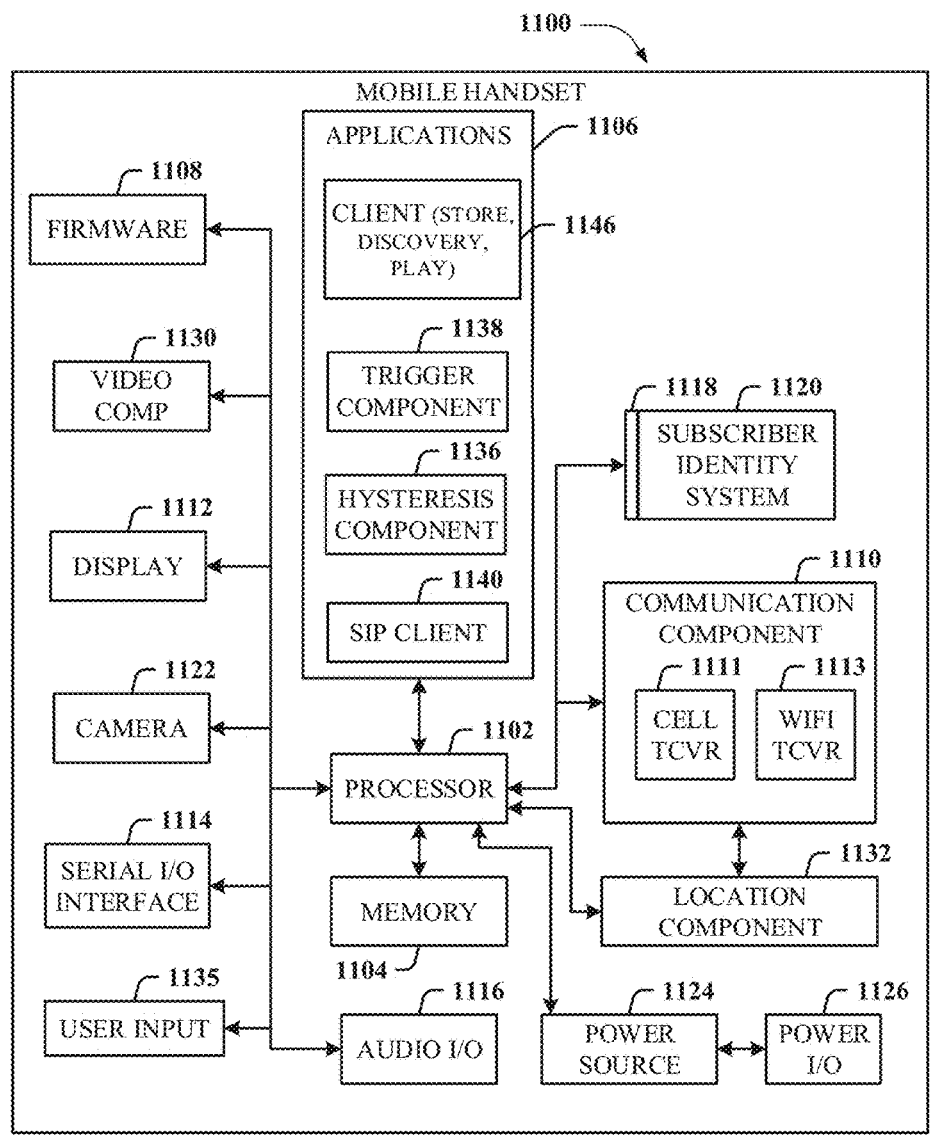
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
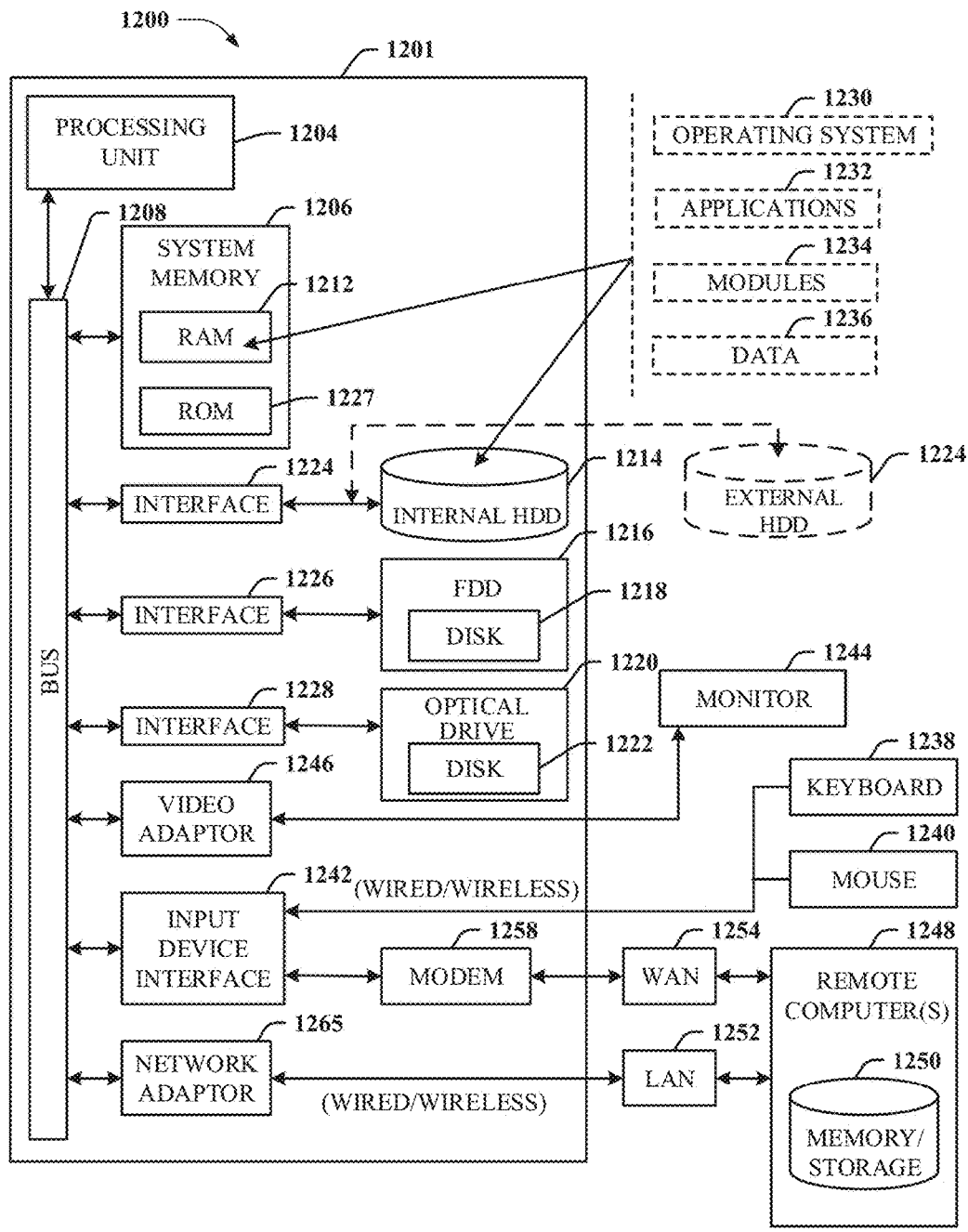
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

With the proliferation of these new IoT devices and the demands placed by them on the next-generation mobility networks, the legacy algorithms and retry mechanisms within the messaging centers, used for traditional smartphones are not adequate to address the non-uniformities in the behavioral sets of such large mix of devices. IoT device behaviors could vary widely to meet the target serving industries and application/use case needs.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a wireless network short message service center device comprising a processor, status data representative of a status of a first mobile device of a wireless network;
based on the receiving the status data, modifying, by the wireless network short message service center device, a retry protocol associated with sending retry messages to the first mobile device, resulting in a modified retry protocol;
sending, by the wireless network short message service center device, a message to the first mobile device; and
in response to receiving an error message associated with the message sent to the first mobile device, resending, by the wireless network short message service center device, the message in accordance with the modified retry protocol, wherein the modified retry protocol is based on a first priority associated with the first mobile device, and wherein the resending the message comprises resending the message to a second mobile device for a defined period of time based on the second mobile device being determined to have a second priority greater than the first priority associated with the first mobile device.

2. The method of claim 1, wherein the modified retry protocol is based on a determined type of device for the first mobile device.

3. The method of claim 2, wherein the status data is received from a mobile switching center device of a mobile switching center, and wherein the status data comprises time data representative of a retry duration, from a mobility management entity device.

4. The method of claim 1, wherein the modified retry protocol is based on an external short messaging identity associated with a service provider identity of a service provider.

5. The method of claim 1, wherein the status data comprises sleep mode data representative of a sleep mode associated with the first mobile device.

6. The method of claim 1, wherein the status data comprises sleep cycle data representative of a requested sleep cycle associated with the first mobile device.

7. The method of claim 1, wherein the status data comprises time data associated with a determined time for the first mobile device to be awakened.

8. A system, comprising:
a processor; and
a memory that stores executable instructions that, when executed by the processor, facilitate performance of operations, comprising:
receiving mode data representative of a mode of a first internet-of-things device of a wireless network;
in response to the receiving the mode data, modifying a message retry protocol associated with resending messages to the first internet-of-things device, resulting in a modified message retry protocol;
in response to facilitating sending a message to the first internet-of-things device, receiving an error message associated with a reception of the message; and
in response to receiving the error message, resending the message to the first internet-of-things device in accordance with the modified message retry protocol, wherein the modified message retry protocol is based on a first priority associated with the first internet-of-things device, and wherein the resending the message comprises resending the message to a second internet-of-things device for a defined period of time based on the second internet-of-things device being determined to have a second priority greater than the first priority associated with the first internet-of-things device.

9. The system of claim 8, wherein the resending the message comprises repeatedly resending the message at a defined time interval.

10. The system of claim 8, wherein the modified message retry protocol is based on a type of the first internet-of-things device.

11. The system of claim 8, wherein the operations further comprise:
receiving mode enhancement data, representative of additional data, from a mobility management entity device, wherein the mode enhancement data is representative of a dormancy state of the first internet-of-things device.

12. The system of claim 8, wherein the modified message retry protocol is based on a sleep mode of the first internet-of-things device.

13. The system of claim 8, wherein the mode data comprises dormancy data associated with a time that the first internet-of-things device is to awaken from a dormant state.

14. The system of claim 13, wherein the operations further comprise:
based on the dormancy data, receiving an indication that the first internet-of-things device will awaken from the dormant state.

15. A non-transitory machine-readable storage medium, comprising executable instructions that, when executed by a processor, facilitate performance of operations, comprising:
receiving status data representative of a status of a first mobile device of a wireless network;
in response to the receiving the status data, adjusting a retry protocol associated with sending retry messages to the first mobile device, resulting in a modified retry protocol;
sending a message to the mobile device;
in response to the sending the message to the first mobile device, receiving an error message associated with the message sent to the first mobile device; and
in response to the receiving the error message, resending the message in accordance with the modified retry protocol, wherein the modified retry protocol is based on a first priority associated with the first mobile device, and wherein the resending the message comprises resending the message to a second mobile device for a defined period of time based on the second mobile device being determined to have a second priority greater than the first priority associated with the first mobile device.

16. The non-transitory machine-readable storage medium of claim 15, wherein the modified retry protocol is based on a sleep cycle associated with the first mobile device.

17. The non-transitory machine-readable storage medium of claim 15, wherein the modified retry protocol is based on a time duration associated with a sleep cycle of the first mobile device.

18. The non-transitory machine-readable storage medium of claim 15, wherein the modified retry protocol is further based on a sleep mode of an internet-of-things device.

19. The non-transitory machine-readable storage medium of claim 18, wherein the status data is comprises time data representative duration time associated with the retry protocol.

20. The non-transitory machine-readable storage medium of claim 15, wherein the operations further comprise:
   buffering the message for a defined period of time in accordance with the modified retry protocol.

\* \* \* \* \*